United States Patent [19]

Klatte

[11] Patent Number: 5,464,598
[45] Date of Patent: Nov. 7, 1995

[54] METHOD FOR REMOVING A CONTAMINANT FROM A FLUID USING A CHEMICALLY IMPREGNATED AND COATED ZEOLITE

[76] Inventor: Fred Klatte, Two Spruce St., San Francisco, Calif. 94118

[21] Appl. No.: 150,438

[22] Filed: Nov. 10, 1993

Related U.S. Application Data

[63] Continuation-in-part of Ser. No. 975,680, Nov. 13, 1992, Pat. No. 5,278,112.

[51] Int. Cl.$^6$ .................................................. C01B 17/02
[52] U.S. Cl. ........................... 423/220; 95/274; 95/902; 210/661
[58] Field of Search ................... 210/807, 500.1, 210/502.1, 506, 661; 423/210, 230, 239.2, 245.1, 215.5, 220; 95/274, 902; 502/60, 62, 86

[56] References Cited

U.S. PATENT DOCUMENTS

| | | | |
|---|---|---|---|
| 2,885,368 | 5/1959 | Hess et al. | 502/60 |
| 3,049,399 | 8/1962 | Gamson et al. . | |
| 3,298,780 | 1/1967 | Fleck | 502/60 |
| 4,554,261 | 11/1985 | Gergely et al. | 502/62 |
| 4,581,219 | 4/1986 | Imada et al. | 423/605 |
| 4,610,882 | 9/1986 | Laurent et al. | 426/72 |
| 4,871,701 | 10/1989 | Danner et al. | 502/62 |
| 5,264,227 | 11/1993 | Laroche et al. | 426/72 |
| 5,302,354 | 4/1994 | Watvedt et al. | 422/177 |
| 5,346,876 | 9/1994 | Ichimura et al. | 502/417 |

FOREIGN PATENT DOCUMENTS

| | | | |
|---|---|---|---|
| 0063436 | 10/1982 | European Pat. Off. | 502/60 |
| 0188138 | 7/1986 | European Pat. Off. | 502/60 |
| 0067521 | 6/1981 | Japan | 502/60 |
| 0000827 | 1/1985 | Japan | 502/60 |
| 2-198629 | 8/1990 | Japan | B01J 20/06 |
| 3-23863 | 1/1991 | Japan . | |

OTHER PUBLICATIONS

Translated Abstract of '863 Reference.
*Material Safety Data Sheet (5 pages), Chemax, Inc. (Jan. 30, 1992).
*Cadena, et al., *Treatment of Waters Contaminated with BTX and Heavy Metals Using Tailored Zeolites*, Feb. 1992, New Mexico Waste–Management Education and Research Consortium, Technical Completion Report (Project No. WERC–91–41), 22 pages.
*Gao, et al., *Use of Tailored Zeolites for Removal of Benzene and Toluene from Water*, 45th Purdue Industrial Waste Conference Proceedings, pp. 509–515, Lewis Publishers, Inc., Chelsea, Mich., 1991 (no month).
*Brochure entitled "Carusorb® 200," by Carus (1 page) (no date).

*Primary Examiner*—Michael Lewis
*Assistant Examiner*—Thomas G. Dunn, Jr.
*Attorney, Agent, or Firm*—Limbach & Limbach

[57] ABSTRACT

A process for impregnating zeolite with a quaternary ammonium cation (QAC) and then coating the impregnated zeolite with permanganate (such as potassium permanganate), and for impregnating zeolite with permanganate and then coating the impregnated zeolite with a QAC, and coated, impregnated zeolite crystals resulting from either process. Either coating acts as a protective agent for the impregnating substance in each zeolite crystal's interior, and allows regulated time release control of the impregnating substance, thus permitting a controlled diffusion (or absorption) rate in applications in which the coated, impregnated zeolite is employed to absorb contaminants from air or water. Combinations of coated and uncoated zeolite crystals can be chosen to match specific environmental circumstances calculable by analysis of the air or water to be treated. Mixtures of coated and uncoated QAC-impregnated zeolite can be used to react with organics such as benzene, toluene, and xylene, uncoated zeolite impregnated with permanganate, and mixtures of coated and uncoated permanganate-impregnated zeolite can be used to react with hydrogen sulfide, acetone, ethylene glycols, formaldehyde, and other contaminants. Other embodiments of the invention are methods for producing zeolite crystals impregnated with manganese dioxide, and for using such manganese dioxide-impregnated crystals to absorb contaminants from fluid.

10 Claims, 1 Drawing Sheet

METHOD FOR REMOVING A CONTAMINANT FROM A FLUID USING A CHEMICALLY IMPREGNATED AND COATED ZEOLITE

The present application is a continuation-in-part of U.S. patent application Ser. No. 07/975,680, filed Nov. 13, 1992, issued as U.S. Pat. No. 5,278,112 on Jan. 11, 1994.

FIELD OF THE INVENTION

The invention relates to processes for producing chemically impregnated zeolite and coated, chemically impregnated zeolite, and to the products of such processes. A preferred embodiment of the invention is a process for chemically impregnating zeolite crystals with either a quaternary ammonium cation or a permanganate, and then coating the impregnated zeolite crystals with the other of these two substances.

BACKGROUND OF THE INVENTION

Zeolites are hydrated metal aluminosilicate compounds with well-defined (tetrahedral) crystalline structures. Because zeolite crystals (both natural and synthetic) have a porous structure with connected channels extending through them, they have been employed as molecular sieves for selectively absorbing molecules on the basis of size, shape, and polarity.

Volumes packed with zeolite crystals (for example, small zeolite crystals chosen to have size in the range from 0.2 mm to several millimeters) have been employed in water and air (or other gas) filtration systems to selectively absorb contaminants from a flowing stream of water or gas.

It has been proposed to treat zeolite crystals by impregnating them with quaternary ammonium cations (such as tetramethylammonium, tetraethylammonium, hexadecyltrimethylammonium, dibenzyldimethylammonium, benzyltriethylammonium, and cetyltrimethylammonium), to enhance the zeolite's capacity to absorb heavy metal, benzene, toluene, and xylene contaminants from water. See, for example, Cadena, et al., "Treatment of Waters Contaminated with BTX and Heavy Metals Using Tailored Zeolites," New Mexico Waste-management Education and Research Consortium Technical Completion Report for Project No. WERC-91-41 (February 1992). If not impregnated with a quaternary ammonium cation (QAC), zeolite does not function adequately as a molecular sieve for organic chemicals such as benzene, toluene, and xylene.

It has also been proposed to impregnate an aqueous solution of permanganate (such as permanganate of potassium, sodium, magnesium, calcium, barium, or lithium) into pores of substrates such as silica gel, alumina, silica-alumina, activated bauxite, and activated clay. The resulting impregnated porous substrates have been employed for filtering and deodorizing air. See, for example, U.S. Pat. No. 3,049,399, issued Aug. 14, 1962, to Gamson, et al.

However, zeolite crystals have not been impregnated (throughout their volume) with permanganate.

Further, because permanganates are strong oxidizing agents, those skilled in the art have avoided exposing quaternary ammonium cations or salts to permanganates (to avoid violent reactions of the type predicted in the literature). For this reason, it has not been proposed to treat a permanganate-impregnated zeolite) with a quaternary ammonium cation or salt. Nor has it been proposed to treat a substrate impregnated with a QAC (quaternary ammonium cation) to permanganate.

We have found that zeolite crystals can readily be impregnated with a usefully high concentration of potassium permanganate. However, we have recognized that, under certain conditions, such permanganate-impregnated zeolite reacts too rapidly to be practically useful for some air filtration applications. For example, when air contaminated with 50 ppm of hydrogen sulfide is caused to flow (at a rate of 15 liters per minute) through a bed of the inventive permanganate-impregnated zeolite crystals (where the crystals have size about 0.25 inch × 0.125 inch, and the bed has volume of 75 cubic centimeters, and dimensions 1" (1d)× 6"), the crystals typically become saturated with hydrogen sulfide within about 48 hours. Although the impregnated zeolite crystals usefully absorb hydrogen sulfide from air, the hydrogen sulfide absorption rate is significantly higher than can be achieved using conventional permanganate-impregnated alumina products, and is undesirably high for some applications.

For both air (and other gas) and water filtration applications, it would be desirable to reduce the rate at which permanganate-impregnated zeolite absorbs selected contaminants, and to control such absorption rate. Similarly, it would be desirable to reduce the rate at which QAC-impregnated zeolite absorbs selected contaminants, and to control such absorption rate. However, until the present invention, it was not known how to achieve either of these objectives.

SUMMARY OF THE INVENTION

In one class of embodiments, the invention is a process for impregnating zeolite crystals with a permanganate, such as potassium permanganate. The product of such process is another embodiment of the invention. A preferred embodiment of the inventive process results in zeolite crystals uniformly impregnated with potassium permanganate (having a potassium permanganate content of about 4% and a moisture content of about 15%), and includes the following steps: dehydrating the zeolite crystals until they have about 5% moisture content, then mixing the dehydrated zeolite crystals with solid potassium permanganate (preferably with a weight ratio P/T substantially equal to 4%, where P is the potassium permanganate weight and T is the total weight of the final product of the process), immersing the solid zeolite and permanganate mixture in (or spraying the solid mixture with) water whose temperature is above room temperature (preferably the water temperature is about 190° F.), thoroughly mixing the resulting slurry, and finally air drying the mixed slurry to produce permanganate-impregnated zeolite crystals having about 15% moisture content. Typically, four pounds of potassium permanganate, fifteen pounds of water, and 86 pounds of dehydrated (5% moisture) zeolite crystals are employed to produce each 100 pounds of the product of this process.

Variations on the preferred embodiment described above produce zeolite crystals uniformly impregnated with potassium permanganate, having a potassium permanganate content greater than 4%, and preferably, as high as in the range from 8% to 10%. In these variations, the dehydrated zeolite crystals are mixed with solid potassium permanganate with a weight ratio P/T greater than 4%, where P is the potassium permanganate weight and T is the total weight of the final product of the process.

In variations on the described embodiments, a permanganate other than potassium permanganate is employed to impregnate the zeolite crystals. Throughout the specification, including in the claims, the term "permanganate" used alone is intended to refer to any permanganate, including permanganate of potassium, sodium, magnesium, calcium, barium, or lithium.

In other preferred embodiments, the method of the invention includes the steps of impregnating zeolite crystals with a quaternary ammonium cation (QAC) and then coating the impregnated zeolite with permanganate, or impregnating zeolite crystals with permanganate and then coating the impregnated zeolite with a QAC. We have unexpectedly found that the process of applying either type of coating does not produce a violent reaction (at most, the coating process results in a minor reaction). We have also unexpectedly found that the coating acts as a protective agent for the impregnating substance in each crystal's interior. The presence of the coating allows regulated time release control of the impregnating substance, and thus permits a controlled diffusion (or absorption) rate in applications in which the coated, impregnated zeolite is employed to absorb contaminants from a fluid such as air or water.

An important aspect of the invention is that the characteristics of a QAC (or permanganate) coating on a zeolite crystal impregnated with permanganate (or QAC) can be varied to control the reaction rate of the impregnating substance within the zeolite. Such characteristics can be varied by changing the concentration of the coating solution employed to coat the impregnated zeolite crystal.

The coated, impregnated zeolite resulting from either embodiment of the inventive method, or uncoated zeolite impregnated with permanganate, or a mixture of the coated, impregnated zeolite resulting from both embodiments, or a mixture of uncoated, impregnated zeolite and the coated, impregnated zeolite resulting from either embodiment of the inventive method, can be used for a variety of molecular sieving applications, such as filtration of contaminants from fluid (such as air or water). The number of combinations of coated and uncoated crystals can match specific environmental circumstances which can be calculated by analysis of the air or water to be treated. One result is that mixtures of coated and uncoated QAC-impregnated zeolite can be used to react with organics such as benzene, toluene, and xylene, and mixtures of coated and uncoated permanganate-impregnated zeolite can be used to react with hydrogen sulfide, acetone, ethylene glycols, formaldehyde, and other contaminants.

Other embodiments of the invention are methods for producing zeolite crystals impregnated with manganese dioxide, and for using such manganese dioxide-impregnated crystals to absorb contaminants from fluid.

DETAILED DESCRIPTION OF THE PREFERRED EMBODIMENTS

Figure 1:
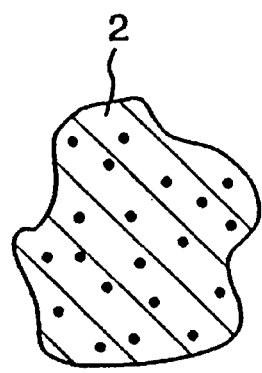
FIG. 1 is a cross-sectional view of a zeolite crystal impregnated with permanganate.

In one class of embodiments, the invention is a process for impregnating zeolite crystals (for example, crystals having size 0.125 inch × 0.10 inch, 0.25 inch × 0.125 inch, 0.125 inch × 0.50 inch, or 0.50 inch × 0.75 inch) with potassium permanganate, and the product of such process. A preferred embodiment of such process, for producing zeolite crystals uniformly impregnated with potassium permanganate, with a 4% potassium permanganate content and a 15% moisture content, includes the steps of initially dehydrating the zeolite crystals to have about 5% moisture content, then mixing the dehydrated zeolite crystals with potassium permanganate crystals (preferably with a weight ratio P/T substantially equal to 4%, where P is the potassium permanganate weight and T is the total weight of the final product of the process), then immersing the crystal mixture in (or spraying the mixture with) water at about 190° F., thoroughly mixing the resulting slurry, and then air drying the mixed slurry to produce potassium permanganate-impregnated zeolite crystals having about 15% moisture content. Typically, the process employs four pounds of potassium permanganate and fifteen pounds of water for every 86 pounds of dehydrated (5% moisture) zeolite crystals, and this mixture (105 pounds) is dried to produce 100 pounds of permanganate-impregnated zeolite crystals having about 15% moisture content. FIG. 1 represents one such impregnated crystal, having channels uniformly impregnated with potassium permanganate 2.

Variations on the preferred embodiment described above produce zeolite crystals uniformly impregnated with potassium permanganate, having a potassium permanganate content of X%, where X is greater than 4, and is preferably in the range from 8 to 10. In such variations, the dehydrated zeolite crystals are mixed with solid potassium permanganate with a weight ratio P/T substantially equal to X%, where P is the potassium permanganate weight and T is the total weight of the final product of the process.

In variations on any of the above-described embodiments, permanganate other than potassium permanganate (such as permanganate of sodium, magnesium, calcium, barium, or lithium) is employed to impregnate the zeolite crystals.

In another variation on the described embodiment, zeolite crystals are immersed in (or sprayed with) aqueous potassium permanganate (having permanganate concentration in the range from about 10% to about 20%), where the weight of aqueous potassium permanganate is about 10% of the weight of the final product of the process. The crystals (after they are dried) will be uniformly impregnated with about a 1% concentration of potassium permanganate.

In yet another variation on the described embodiment, zeolite crystals are immersed in (or sprayed with) super-saturated aqueous potassium permanganate (having permanganate concentration of 20% or higher) at 190° F., where the weight of aqueous potassium permanganate is about 10% of the weight of the final product of the process. The zeolite crystals (after they are dried) are uniformly impregnated with a concentration of potassium permanganate greater than 1%.

For many applications (including air and water filtration applications), the desired concentration of potassium permanganate impregnated in zeolite crystals is in the range from about 1% to about 4% (or from about 1% to about 8% or 10%).

However, as explained above, the inventive permanganate-impregnated zeolite may have an activity rate too high or too low for some useful applications (i.e., its rate of absorption of contaminants may be too high, or too low, for some air or water filtration applications). We have found that the rate at which permanganate-impregnated zeolite absorbs (or reacts with, or both absorbs and reacts with) selected contaminants can be controlled (and reduced or increased to a desired level) by applying a quaternary ammonium cation (QAC) coating to the permanganate-impregnated zeolite. We have also found that the rate at which QAC-impregnated zeolite absorbs selected contaminants can be controlled (and reduced or increased to a desired level) by applying a permanganate coating to the QAC-impregnated zeolite.

Figure 2:
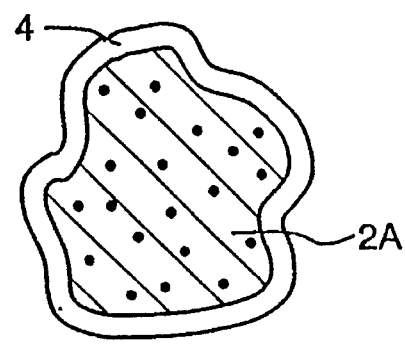
FIG. 2 is a cross-sectional view of the impregnated zeolite crystal of FIG. 1, after it has been coated with a QAC in accordance with the invention.

Thus, in a first class of preferred embodiments, the inventive method includes the steps of impregnating zeolite with permanganate (preferably, potassium permanganate) and then coating the impregnated zeolite with a QAC (preferably, cetyltrimethylammonium, although other QACs are suitable for certain applications). FIG. 2 represents one such impregnated crystal, whose channels contain QAC 4 in the region near the crystal's surface, and whose channels are impregnated with potassium permanganate 2a throughout the volume of the crystal inside the region containing QAC 4.

In a second class of preferred embodiments, the inventive method includes the steps of impregnating zeolite with a QAC (preferably, cetyltrimethylammonium) and then coating the impregnated zeolite with permanganate (preferably, potassium permanganate). The coated, impregnated zeolite resulting from either class of preferred embodiments of the inventive method (or a mixture of the coated, impregnated zeolite resulting from both embodiments, or a mixture of uncoated impregnated zeolite with the coated, impregnated zeolite resulting from either class of preferred embodiments of the inventive method) is useful for a variety of molecular sieving applications (such as filtration of contaminants from air or water). The advantages of the inventive impregnated zeolite (over conventional air filtration chemicals) include lower manufacturing cost (including lower drying cost) and a reduced level of dusting during processing and handling, as well as improved contaminant absorption characteristics.

Our development of the first class of preferred embodiments began with our unexpected observation that no obvious reaction resulted from immersion of potassium permanganate-impregnated zeolite in (or spraying of such impregnated zeolite with) liquid cetyltrimethylammonium chloride (with a weight ratio Q/T in the range from 0.1% to 5%, where Q is the cetyltrimethylammonium chloride weight and T is the total weight of the final product of the process). As a result of such immersion (or spraying), a QAC coating was applied to each permanganate-impregnated zeolite crystal in the sense that the QAC (cetyltrimethylammonium) entered the channels near each crystal's outer surface but the QAC did not penetrate farther into the interior of each crystal. From a practical point of view, we have found that the weight ratio of liquid cetyltrimethylammonium chloride employed for coating permanganate-impregnated zeolite crystals should preferably (at least for most air filtration applications) satisfy the following relation: $0.1\%<Q/T<0.5\%$, where Q is the cetyltrimethylammonium chloride weight and T is the total weight of the final product of the process.

As a result of permanganate leaching studies on the inventive QAC-coated, potassium permanganate-impregnated zeolite crystals (in which the coated, permanganate-impregnated zeolite crystals were immersed in, or sprayed with, water and the permanganate concentration in the water measured over time), we determined that the QAC coating substantially slowed the permanganate leaching rate (and thus would substantially slow the expected activity rate, i.e., the rate at which the impregnated zeolite would absorb and/or react with contaminants such as organic chemicals). This result was highly unexpected in view of the conventional belief that the presence of QAC would increase zeolite's absorption of organic chemicals (such as toluene).

We found that the activity rate of QAC-coated, potassium permanganate-impregnated zeolite depends on the concentration of the QAC solution with which the permanganate-impregnated zeolite is coated. Increasing the QAC concentration will decrease the activity rate. We found that the leaching rate of permanganate from within QAC-coated, impregnated zeolite (and hence the expected activity rate) is negligible if the weight ratio of the QAC coating is in the range from 1% to 2% (i.e., if the weight of liquid cetyltrimethylammonium chloride employed for coating permanganate-impregnated zeolite crystals satisfies the relation $1\%<Q/T<2\%$, where Q is the cetyltrimethylammonium chloride weight and T is the total weight of the final product of the process). To produce QAC-coated, potassium permanganate-impregnated zeolite for most air filtration applications, the optimum QAC coating weight ratio is in the range from 0.1% to 0.5% (i.e., the weight of liquid cetyltrimethylammonium chloride employed for coating the permanganate-impregnated zeolite crystals satisfies the relation $0.1\%<Q/T<0.5\%$, where Q is the cetyltrimethylammonium chloride weight and T is the total weight of the final product of the process). However, for permanganate-impregnated zeolite crystals with a permanganate concentration greater than 4%, it may be desirable to employ a greater amount of QAC for the coating (i.e., the weight of liquid cetyltrimethylammonium chloride employed for the coating should satisfy the relation $1\%<Q/T<2\%$, where Q is the cetyltrimethylammonium chloride weight and T is the total weight of the final product of the process).

An optimal permanganate-impregnated zeolite product for absorbing (and/or reacting with) any of a wide variety of contaminants (or contaminant groups) from a fluid (such as air or water) can be determined experimentally in the following manner. Uncoated, QAC-impregnated zeolite crystals (preferably produced in the manner described below) are mixed in various ratios with QAC-coated, permanganate-impregnated zeolite crystals, and the contaminant absorption and/or reaction characteristics of each mixture studied. The mixture producing the best absorption and/or reaction characteristics is identified as the optimal mixture.

Figure 3:
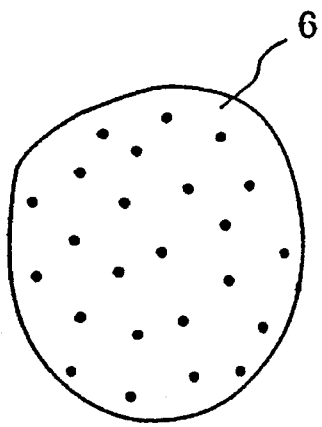
FIG. 3 is a cross-sectional view of a zeolite crystal impregnated with QAC.

Since the QAC known as cetyltrimethylammonium is commercially available in aqueous form, impregnation of zeolite with this aqueous QAC product can be accomplished more easily than can impregnation of zeolite with potassium permanganate. A preferred method for impregnating zeolite crystals with QAC to produce zeolite crystals uniformly impregnated with cetyltrimethylammonium cations includes the following steps: dehydrating the zeolite crystals to have about 5% moisture content, then immersing the dehydrated zeolite crystals in (or spraying the dehydrated crystals with) liquid cetyltrimethylammonium chloride (the cetyltrimethylammonium chloride weight is preferably in the range from 5% to 15% of the total weight of the final product of the process) and thoroughly mixing the resulting slurry, and finally air drying the mixed slurry to produce the cetyltrimethylammonium-impregnated zeolite crystals. Typically, fifteen pounds of liquid QAC and 90 pounds of dehydrated (5% moisture) zeolite crystals are employed to produce each 100 pounds of such cetyltrimethylammonium-impregnated zeolite crystals. FIG. 3 represents one such impregnated crystal, whose channels are uniformly impregnated with QAC 6.

Although the QAC in preferred embodiments of the invention is cetyltrimethylammonium, other QACs can be substituted for cetyltrimethylammonium in alternative embodiments.

Figure 4:
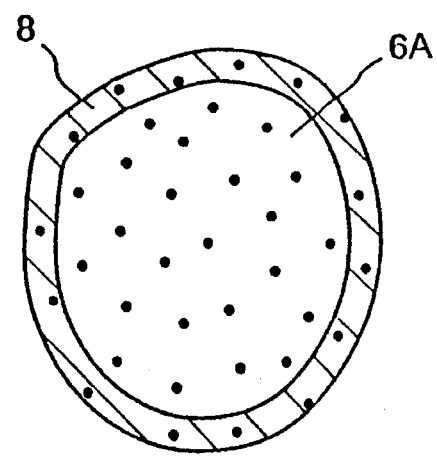
FIG. 4 is a cross-sectional view of the impregnated zeolite crystal of FIG. 3, after it has been coated with permanganate in accordance with the invention.
Figure 5:
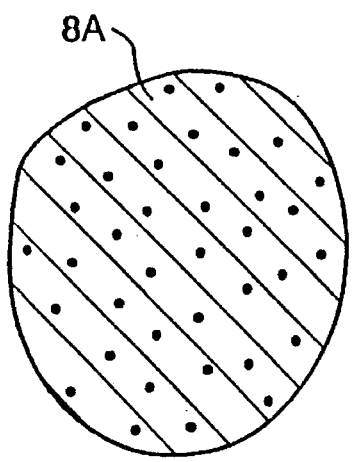
FIG. 5 is a cross-sectional view of the impregnated zeolite crystal of FIG. 3, after it has been immersed in an excessively concentrated permanganate solution (so that the permanganate has replaced the impregnating QAC).

We have also unexpectedly observed that no obvious reaction resulted from immersion of cetyltrimethylammonium-impregnated zeolite in (or spraying of such impregnated zeolite with) aqueous potassium permanganate (where the weight of the potassium permanganate is in the range from 0.1% to 2% of the weight of the impregnated zeolite). Where the weight of the potassium permanganate in the immersing (or spraying) solution is in the range from 0.1% to 1% of the weight of the impregnated zeolite, we have found that the immersion (or spraying) results in application of a permanganate coating to each QAC-impregnated zeolite crystal (in the sense that permanganate enters the channels near each crystal's outer surface but permanganate does not penetrate farther into the interior of each crystal). FIG. 4 represents one such coated, impregnated crystal, whose channels contain permanganate 8 in the region near the crystal's surface, and whose channels are impregnated with QAC 6a throughout the volume of the crystal inside the region containing permanganate 8.

Where the weight of the permanganate in the immersing (or spraying) solution is above 1% of the weight of the impregnated zeolite, we have found that immersion of QAC-impregnated zeolite crystals in (or spraying of QAC-impregnated zeolite with) aqueous permanganate results in penetration of permanganate throughout the channels of each crystal (with permanganate displacing QAC from channels not only near each crystal's outer surface but also from channels deep within the interior of each crystal). FIG. 5 represents the result of immersing the FIG. 3 crystal in (or spraying the crystal with) such a high concentration of aqueous permanganate. As indicated in FIG. 5, the crystal's channels are uniformly impregnated with permanganate 8a (which has replaced substantially all the QAC 6 shown in FIG. 3).

From a practical point of view, we have found that potassium permanganate solution for coating QAC-impregnated zeolite crystals, such as that shown in FIG. 3, preferably (at least for many air filtration applications) includes a total weight of permanganate in the range from 0.1% to 0.5% of the weight of the final weight of the permanganate-coated, QAC-impregnated product of the process.

As a result of permanganate leaching studies on the inventive potassium permanganate-coated, QAC-impregnated zeolite crystals (in which the coated, QAC-impregnated zeolite crystals were immersed in water and the QAC concentration in the water measured over time), we determined that the permanganate coating substantially slowed the QAC leaching rate (and thus would substantially slow the expected activity rate, i.e., the rate at which the impregnated zeolite would absorb contaminants such as organic chemicals).

We found that the activity rate of permanganate-coated, QAC-impregnated zeolite depends on the concentration of the permanganate solution with which the QAC-impregnated zeolite is coated. Increasing the permanganate concentration of the coating solution will decrease the activity rate (until the concentration is reached at which the permanganate penetrates through the entire volume of each zeolite crystal, displacing QAC impregnated throughout such volume). To produce potassium permanganate-coated, QAC-impregnated zeolite for most air filtration applications, the optimum weight of permanganate in the coating solution is in the range from 0.1% to 0.5% of the final weight of the permanganate-coated, QAC-impregnated product of the process.

An optimal QAC-impregnated zeolite product for absorbing any of a wide variety of contaminants (or contaminant groups) from a fluid (such as air or water) can be determined experimentally in the following manner. Uncoated, permanganate-impregnated zeolite crystals are mixed in various ratios with permanganate-coated, QAC-impregnated zeolite crystals, and the contaminant absorption characteristics of each mixture studied. The mixture producing the best absorption characteristics is identified as the optimal mixture.

It may also be useful to mix the inventive permanganate-coated, QAC-impregnated zeolite crystals with the inventive QAC-coated, permanganate-impregnated zeolite crystals.

An important aspect of the invention is that the characteristics of a QAC (or permanganate) coating on a zeolite crystal impregnated with permanganate (or QAC) can be varied to control the reaction rate of the substance impregnated within the zeolite. Such characteristics can be varied by changing the concentration of the coating solution in which (or with which) the impregnated zeolite crystal is immersed (or sprayed) to form the coating.

Other aspects of the invention include a method for producing zeolite crystals impregnated with manganese dioxide, and methods for using such manganese dioxide-impregnated zeolite crystals to absorb contaminants from fluid (especially liquids).

When zeolite crystals impregnated with permanganate (with or without a QAC coating) are employed to filter air, they eventually become "spent" (due to chemical reaction with the air and contaminants therein). The inventor has recognized that each of the "spent" zeolite crystals is substantially uniformly impregnated with Mn++ ions throughout its volume. The inventor has also recognized that immersing the spent zeolite crystals in a permanganate solution causes the Mn++ ions to react, and thus results in production of zeolite crystals impregnated with manganese dioxide (each such crystal being substantially uniformly impregnated with manganese dioxide throughout its volume).

One mechanism by which permanganate-impregnated zeolite becomes impregnated with Mn++ ions (as it becomes "spent" when employed to filter air) is as follows. This example assumes that the zeolite is initially impregnated with potassium permanganate ($KMnO_4$), and that the potassium permanganate-zeolite is employed to filter air contaminated with $H_2S$ (or other oxidizable gases). The following reaction will result in the zeolite becoming impregnated with $Mn^{++}$ ions as it becomes "spent":

$$KMnO_4 + H_2S \rightarrow (S) + Mn^{++} + H_2O.$$

Reimpregnation of the spent zeolite crystals with potassium permanganate will then produce zeolite crystals impregnated with manganese dioxide ($MnO_2$) as a result of the following reaction:

$$KMnO_4 + Mn^{++} \rightarrow MnO_2 + K^+.$$

The manganese dioxide-impregnated zeolite crystals of the invention can be coated with a QAC. The presence of such QAC coating allows regulated time release control of the impregnating manganese dioxide (which is an oxidizing filtering agent), and thus permits a controlled diffusion (or absorption) rate in applications in which QAC-coated, manganese dioxide-impregnated zeolite crystals are employed to absorb contaminants from a fluid (especially a liquid such as water). The characteristics of the QAC coating can be varied to control the reaction rate of the impregnating substance (manganese dioxide) within the zeolite crystals. Such characteristics can be varied by changing the concentration of the coating solution employed to coat the impregnated zeolite crystals.

The manganese dioxide-impregnated zeolite crystals, or QAC-coated, manganese dioxide-impregnated zeolite crystals of the invention, can be used for a variety of molecular sieving applications, such as filtration of contaminants from fluid (especially liquid). Various combinations of such coated and uncoated crystals can be employed to match specific environmental circumstances which can be calculated by analysis of the fluid to be treated.

To perform fluid filtration, the fluid is caused to flow through a bed of the inventive manganese dioxide-impregnated zeolite crystals (coated or uncoated).

Various modifications and variations of the described method of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A method for absorbing a contaminant from a fluid, including the step of:

flowing the fluid containing said contaminant through a bed comprising coated, impregnated zeolite crystals and thereby absorbing said contaminant from the fluid, wherein the coated, impregnated zeolite crystals have been produced by:

(a) producing impregnated zeolite crystals by impregnating zeolite crystals with a first chemical selected from a group consisting of a quaternary ammonium cation and a permanganate; and (b) after step (a), coating the impregnated zeolite crystals with a second chemical selected from said group, wherein the second chemical is different than the first chemical.

2. The method of claim 1, wherein the first chemical is a quaternary ammonium cation.

3. The method of claim 2, wherein the quaternary ammonium cation is cetyltrimethylammonium.

4. The method of claim 1, wherein the first chemical is a permanganate.

5. The method of claim 4, wherein the permanganate is potassium permanganate.

6. The method of claim 1, wherein step (b) results in production of the coated, impregnated zeolite crystals, and wherein step (b) includes the step of:

immersing the impregnated zeolite crystals in, or spraying the impregnated zeolite crystals with, aqueous permanganate, wherein the aqueous permanganate has a permanganate concentration for causing the coated, impregnated zeolite crystals to absorb a contaminant of interest at a desired rate from the fluid.

7. The method of claim 1, wherein step (b) results in production of the coated, impregnated zeolite crystals, and wherein step (b) includes the step of:

immersing the impregnated zeolite crystals in, or spraying the impregnated zeolite crystals with, liquid cetyltrimethylammonium chloride, wherein the liquid cetyltrimethylammonium chloride has a weight selected to cause the coated, impregnated zeolite crystals to absorb a contaminant of interest at a desired rate from the fluid.

8. The method of claim 1, wherein the bed also comprises uncoated zeolite crystals impregnated with the first chemical.

9. A method for absorbing a contaminant from a fluid, including the steps of:

(a) producing impregnated zeolite crystals by impregnating zeolite crystals with a first chemical selected from a group consisting of a quaternary ammonium cation and a permanganate;

(b) after step (a), coating at least some of the impregnated zeolite crystals with a second chemical selected from said group, wherein the second chemical is different than the first chemical; and (c) flowing the fluid containing said contaminant through a bed comprising coated, impregnated zeolite crystals produced during step (b) and thereby absorbing said contaminant from the fluid.

10. A method for absorbing a contaminant from a fluid, including the steps of:

(a) producing a first quantity of impregnated zeolite crystals, by impregnating zeolite crystals with a first chemical selected from a group consisting of a quaternary ammonium cation and a permanganate;

(b) after step (a), coating the first quantity of impregnated zeolite crystals with a second chemical selected from said group, wherein the second chemical is different than the first chemical; and (c) flowing the fluid containing said contaminant through a bed comprising a mixture of coated, impregnated zeolite crystals produced during step (b), and a second quantity of impregnated zeolite crystals, wherein the impregnated zeolite crystals in the second quantity have been impregnated with said first chemical and thereby absorbing said contaminant from the fluid.

* * * * *